(12) United States Patent
Mathur et al.

(10) Patent No.: US 6,811,600 B2
(45) Date of Patent: Nov. 2, 2004

(54) CHEMICALLY BULKED KAOLIN CLAY PIGMENT COMPATIBLE WITH CALCIUM CARBONATE AND MANUFACTURE THEREOF

(75) Inventors: Sharad Mathur, Macon, GA (US); Richard R. Berube, Holmdel, NJ (US)

(73) Assignee: Engelhard Corporation, Iselin, NJ (US)

( * ) Notice: Subject to any disclaimer, the term of this patent is extended or adjusted under 35 U.S.C. 154(b) by 42 days.

(21) Appl. No.: 10/350,370

(22) Filed: Jan. 23, 2003

(65) Prior Publication Data

US 2004/0144509 A1 Jul. 29, 2004

(51) Int. Cl.⁷ .............................................. C04B 14/26
(52) U.S. Cl. ....................... 106/486; 106/484; 106/487; 106/488; 106/464; 106/465
(58) Field of Search ................................ 106/464, 465, 106/484, 486, 487, 488

(56) References Cited

U.S. PATENT DOCUMENTS

| | | |
|---|---|---|
| 4,738,726 A | 4/1988 | Pratt et al. ................... 106/308 |
| 4,772,332 A | 9/1988 | Nemeh et al. ............... 106/487 |
| 4,859,246 A | 8/1989 | Sennett ........................ 106/487 |

FOREIGN PATENT DOCUMENTS

| | | | |
|---|---|---|---|
| WO | WO 99/15596 | * 1/1999 | ........... C09D/17/00 |
| WO | WO99/15596 | 4/1999 | |

* cited by examiner

*Primary Examiner*—C. Melissa Koslow
*Assistant Examiner*—Shalie Manlove
(74) *Attorney, Agent, or Firm*—Melanie L. Brown

(57) ABSTRACT

In a process for preparing a white pigment mixture suitable for coating paper wherein a cationically bulked kaolin clay pigment is dispersed in water in the presence of an anionic dispersant and mixed with a calcium carbonate pigment, the improvement which comprises using an epichlorohydrin amine complex to bulk said kaolin, and employing as the dispersant the combination of at least 0.2% based on the dry weight of said cationically bulked kaolin of a condensed naphthalene sulfonate complex having a molecular weight of 2000 to 10,000 and a sodium polyacrylate salt having a molecular weight of 2000 to 5000, said dispersant being free from lignosulfonate.

20 Claims, No Drawings

CHEMICALLY BULKED KAOLIN CLAY PIGMENT COMPATIBLE WITH CALCIUM CARBONATE AND MANUFACTURE THEREOF

FIELD OF THE INVENTION

This invention relates to improvements in kaolin clay pigments chemically bulked by addition of a cationic polymer and, particularly, to improvements wherein the cationically bulked kaolin clay is mixed with a calcium carbonate pigment. More specifically, the invention relates to means for avoiding an undesirable increase in viscosity of high solids dispersed aqueous slurry of cationically bulked kaolin clay when mixed with a calcium carbonate pigment.

BACKGROUND OF THE INVENTION

It has been well known for many years that the utility of kaolin clay as a pigment to coat or fill paper can be improved significantly by bulking the kaolin with a cationic polymer. See, for example, commonly assigned U.S. Pat. No. 4,738,726, Pratt et al, U.S. Pat. No. 4,772,332, Nemeh et al and U.S. Pat. No. 4,859,246, Sennett. These bulked kaolins are sometimes referred to as "Chemically Engineered Kaolins" (CEK). One of the difficulties encountered in commercializing the cationically bulked kaolin clay involves providing concentrated (high solids) aqueous slurries of the bulked kaolin that possess the rheology especially desired by the paper industry. Considerable experimentation has been carried out in the past to provide suitable dispersant systems to achieve the desired rheology. See, for example, commonly assigned U.S. Pat. No. 4,772,332, Nemeh et al, U.S. Pat. No. 4,859,246, Sennett, and PCT, WO99/15596, Willis et al.

For many years, a polydiallyl polymer (referred to as polydadmac) was used commercially as the cationic polymer. More recently, it was found that epichlorohydrin amine condensates were superior in some respects. The polyamine cationic polymers were considered capable of providing higher solids fluid slurries.

Unexpectedly, we discovered that high solids dispersed slurries of chemically bulked kaolin produced with epichlorohydrin amine condensates tended to increase significantly in viscosity when mixed with calcium carbonate pigments. This did not occur when polydadmac was used.

Past efforts to improve the viscosity (fluidity) of slurries of cationically bulked kaolin pigment, have centered on the selection of dispersants. Specifically, anionic sulfonate dispersants, especially when used in combination with polyacrylate dispersants, were found to be advantageous. See the aforementioned commonly assigned patents and publications. For example, U.S. Pat. No. 4,859,246 discloses the use of lignosulfonates and naphthalene formaldehyde sulfonates (Lomar®D) for this purpose. Illustration examples used polydadmac. High shear (using WARING BLENDOR® mixer) was employed in lab tests; lower shear (Cowles mixer) were used in pilot plant tests. Levels of sulfonates up to 0.1% by weight of dry clay were used in examples. U.S. Pat. No. 4,772,332 (supra) teaches the desirability of using combinations of ligno and naphthalene sulfonates but notes the adverse effect of lignosulfonate on pigment brightness. See col. 6, lines 51 et seq. U.S. Pat. No. 4,772,332 teaches the use of 0.05% to 0.15% of sulfonate. WO 99/15566 discloses the use with an epichlorohydrin amine bulking agent of 8#/ton (0.4% of dry kaolin) of a dispersant mixture of sodium polyarylate, lignosulfonate and naphthalene sulfonate in unidentified proportions. No carbonate pigment was present.

THE INVENTION

It has now been discovered that high solids slurries of kaolin clay bulked with an epichlorohydrin amine condensate can be made more compatible with calcium carbonate pigments provided the dispersant used to disperse the chemically bulked kaolin has a relatively high content of a naphthalene sulfonate complex dispersant, (0.20 to 0.30% based on the dry weight of the bulked kaolin) and lignosulfonate dispersants are excluded. From 0.10 to 0.16% by weight of an acrylate salt co-dispersant must also be present. The amount of calcium carbonate pigment is from 1% to 40% based on the dry weight of the bulked kaolin.

DETAILED DESCRIPTION OF PREFERRED EMBODIMENTS OF THE INVENTION

The Kaolin Clay

It is known that the shape of the particle size distribution curve of the kaolin clay used to produce bulked pigments has an effect on the pigment's end-use application such as in coating and filling paper. A clay having the following particle size distribution characteristics has been found to provide optimum rheology: a median particle size of 0.55 micrometers and a particle size distribution such that about 88 +/- 2% of the particles have an equivalent spherical diameter less than about 2 micrometers and not more than about 35% by weight, preferably not more than about 25% by weight, have an equivalent spherical diameter less than 0.3 micrometers. If the particle size is too coarse, gloss and opacity suffer although opacity will be greater than the clay before treatment with the cationic polymer. If the quantity of ultrafine particles, i.e., particles 0.3 micrometers and finer, is too great, the rheology of the pigment may be such that it has limited, if any, use.

In order to achieve the desired particle size distribution of the kaolin that is eventually formed into a bulked structure, it is generally necessary to perform one or more particle size separations on the crude clay. Convention centrifugal sedimentation to recover a size fraction of desired particle size, such as for example, a fraction that is 90% by weight finer than 2 micrometers and does not contain an excessive amount of ultrafine particles. The teachings of U.S. Pat. No. 4,738,726 are incorporated herein by cross-reference. Chemical methods to fractionate the kaolin can be used instead of using mechanical means such as centrifugation See U.S. Pat. No. 5,938,833, Willis et al.

In practice of this invention, the median particle size of the clay particles that are treated with the polyamine bulking agent should range from 0.4 to 0.7 micrometers, equivalent spherical diameter (e.s.d.), preferably 0.5 to 0.6 micrometers, as determined by conventional sedimentation techniques using the SEDIGRAPH® particle size analyzer, supplied by Micromeretics, Inc. From about 80% to 95% by weight of the particles should be finer than 2 micrometers, e.s.d. The content of fines below 0.3 micrometer e.s.d. should be below 35 weight percent and preferably below 25 weight percent.

In one preferred embodiment of the invention, Example 13, a delaminated grade of kaolin is used.

Preferably, the chemically bulked kaolin product has a brightness of at least 90%.

The polyquaternary amine polymer useful in this invention to bulk the kaolin is a water soluble or dispersible cationic polyelectrolyte polymers derived from (i) reaction of secondary amines, such as dialkylamines, and difunctional epoxide compounds or precursors thereof or (ii) reaction of a lower dialkylamines ($C_1$–$C_3$), a difunctional epoxy type reactant (the same as (i)) and a third reactant selected from the group consisting of ammonia, primary amines, alkylenediamines of from 2–6 carbon atoms, and polyamines. The group (i) polymers are disclosed in U.S. Pat. No. Re. 28,807 (Panzer, et al.). The entire disclosure of this reissue patent is hereby incorporated by reference herein.

As to the epoxy reactant, epihalohydrins, such as epichlorohydrin is especially preferred.

As to the secondary amines, which may be used as reactants, these include dimethylamine, diethylamine, dipropylamine, and secondary amines containing mixtures of alkyl groups having 1 to 3 carbon atoms.

Suitable reaction parameters may be found in U.S. Pat. No. Re. 28,807. The preferred polymer of group (i) is formed from dimethylamine and epichlorohydrin reaction. Such reaction is detailed in Example 1 of the reissue patent.

Suitable commercially available polymers of the group (i) type are sold under the trade names SHARPFLOC® 22, SHARPFLOC® 23, and SHARPFLOC® 24. The molecular weights of these polymers are estimated to be in the range of approximately 2,000–10,000 atomic mass units (amu). The particular molecular weights of these polymers are not critical as long as the polymers remains water soluble or water dispersible.

The group (ii) polymers which may be used in accordance with the invention, may be generically characterized as branched polyquaternary ammonium polymers and are described in detail in U.S. Pat. No. Re. 28,807 (Panzer, et al.).

Exact reaction parameters for the group (ii) cationic polyelectrolytes are specified in aforementioned U.S. Pat. No. Re. 28,807. A preferred group (ii) polymer is a crosslinked polyquaternary polymer formed from ethylenediamine, dimethylamine and epichlorohydrin (see for instance Example 2 of U.S. Pat. No. Re. 28,807).

Suitable commercially available polymers of the group (ii) type are sold under the trade names of SHARPFLOC® 25, SHARPFLOC® 26, SHARPFLOC® 27, SHARPFLOC® 28, SHARPFLOC® 29, SHARPFLOC® 30, SHARPFLOC® 31, SHARPFLOC® 32, and SHARPFLOC® 33. The molecular weight of these polymers is estimated to range from approximately 20,000 to 500,000 amu. The particular molecular weights of these polymers are not critical as long as the polymers remain water soluble or water dispersible.

The term "cationically bulked" is used in conventional manner and refers to flocculation of particulate slurries with a polyelectrolyte to result in a void structure that leads to enhanced light scattering in a coating.

The calcium carbonate pigment is present in amount in the range of ½ to 40% (dry weight) based on the dry weight of the bulked kaolin pigment. Preferred are ground grades of calcium carbonate pigment added by an end user to slurry of the bulked kaolin after the bulked kaolin is dispersed, in accordance with this invention. However it is within the scope of the invention to add the calcium carbonate before adding dispersant. The invention is also of benefit when calcium carbonate is present as an impurity with the kaolin clay before the kaolin is bulked.

Brightness of the mixture of kaolin and calcium carbonate of the mixture is preferably at least 88%, preferably above, and most preferably 90% or higher.

The amount of polymer needed to achieve the benefits of this invention ranges from 0.025 to 0.250 weight %, preferably from 0.05 to 0.20 weight %, most preferably from 0.100 to 0.150 weight % relative to the dry clay being treatment. These treatment amounts are far less than the amount of polymer (cationic in nature) typically needed to cationize the clay particles (anionic in nature). As is understood by those skilled in the art, the precise optimum amount of polymer used to treat the clay may vary according the type of clay selected to be treated and according to the molecular weight and composition of the polymer used. Also it is understood by one skilled in the art that benefits of this invention are expected to be achievable when the polymer used is predominately of the type of polymer claimed (i.e., minor amounts of impurities or other polymers may be present as long as benefits of this invention are not destroyed).

The manner by which the kaolin clay is treated with the polyquaternary polyamine polymer of the present inventions is by any suitable method that will cause bulking of the clay when contacted with the polymer. Such methods are described herein and also in U.S. Pat. No. 4,738,726, the disclosure of which is incorporated by reference in its entirety.

Such methods include but are not limited to forming a fluid aqueous suspension of particles of kaolin clay, adding the water soluble or water dispersible polyquaternary amine polymer of this invention in an amount to substantially thicken and flocculate the fluid suspension. The polymer or the aqueous suspension typically can be added at ambient temperatures or separately or together may be heated to about 150 to 180° F. The resulting flocculated clay suspension may be acidified (preferably in the pH range of 2.5 to 4.0), bleached, filtered (to recover the bulked clay), washed with tap or heated tap water, and treated with a deflocculant (typically in an amount less than 0.2 to 0.3 wt % based on recovered clay) to provide fluid suspension of the claimed pigment composition. Desirably, the suspension has a solids content in the range of 65 to 70% solids preferably 67 to 70% and a Brookfield viscosity of 1000 cP or below.

The fluid suspension may then be spray dried after or before permitting the suspension to age. Also, the clay suspension may be deflocculated before the polymer is added.

In practicing this invention, the minimum amount of naphthalene formaldehyde sulfonate complex dispersant that must be used to provide a fluid slurry of the bulked kaolins is in the range of 0.20 to 0.03% by weight, based on the dry weight of the kaolin. Above 0.3% by weight pigment brightness may suffer. Below 0.2% the benefits are not adequate. The especially preferred range is 0.2 to 0.25%. The minimum of sodium polyacrylate (dry weight basis) is 0.10%. Preferred is 0.10 to 0.16% by weight.

The molecular weight of the anionic naphthalene sulfonate dispersant is between 2000 to 10,000 amu. Lower molecular weight naphthalene sulfonate function as surfactants, not dispersants, and have been found to be ineffective for purposes of this invention. Molecular weight of sulfonates used in practice of this invention was determined via Gel Permeation Chromatography. The molecular weight of the polyacrylate co-dispersant is generally in the range of 2000 to 5000 amu.

Naphthalene formaldehyde sulfonate complexes used in practice of this invention exemplified by "Lomar®D" are commercially available as sodium salts from Geo Specialty Chemicals. Lomar D is a more highly polymerized naphthalene sulfonate than most of the condensates of this chemical class. Lomar D is available as a fine tan powder easily dispersed in water. The average molecular weight of Lomar® D dispersant used in the experimental examples was 8,037 amu as determined by Gel Permeation Chromotography (GPC). Commercial naphthalene sulfonate complexes having average molecular weights of 234 amu and 218 amu did not produce satisfactory results.

As mentioned, the cationic polymer used in accompanying examples (SHARPFLOC® 26) is a cross-linked polyquaternary polymer formed from ethylenediamine, dimethyamine and epichlorohydrin.

As mentioned a polyacrylate salt is used along with naphthalene sulfonate to disperse the bulked kaolin. C-211 from Kemira is a sodium polyacrylate, molecular weight 3400–3600 amu, supplied as a 43% aqueous solution that is suitable for kaolin slurry dispersion. DEQUEST® 2006 from Solutia is a sodium salt of phosphonic acid supplied at 40% solution. This chemical allegedly serves as a chelant to reduce the hardness of water. N-22 is sodium lignosulfonate. The C-235, C-144 and C-154 formulations were made firm these ingredients and supplied by Kemira.

The term "CEK" used in the example refers to "chemically engineered kaolin." In the examples, SF 26 was used to bulk the kaolin except in the comparative example in which the cationic polymer, used as a control was dimethyl diallyl quaternary ammonium chloride commercially available under the trademark Sharpe C-1 polymer from Sharpe Specialty Chemicals.

In the following illustrative example test procedures (for measuring particle size, viscosity, brightness, solids and light scatter) described in detail in U.S. Pat. No. 4,772,332 were used. These procedures are incorporated herein by cross-reference.

In the illustrative examples various secondary dispersants (Colloid 235, Colloid 144, and Colloid 154) were employed. The composition of these secondary dispersants (dry weight basis) is as follows:

|  | Colloid 235 (C-235) | Colloid 144 (C-144) | Colloid 154 (C-154) |
| --- | --- | --- | --- |
| Water | 73.8 | 75.0 | 66.7 |
| C211 | 13.0 | 14.0 | 12.5 |
| DEQUEST 2006 | 1.6 | 1.6 | 1.4 |
| Lomar D | 4.0 | 6.0 | 16.4 |
| N-22 | 4.2 | — | — |
| NaOH | 3.4 | 3.4 | 3.0 |
| Total, wt | 100.0 | 100.0 | 100.0 |

In the accompanying illustrative example coarse white kaolin crude from Washington County, Ga. was dispersed with an alum-silicate hydrosol and soda ash. (Other dispersants that may be used at this point of the process are sodium silicate, condensed phosphate salts or low molecular weight polyacrylate salts or combinations thereof.) The kaolin crude pH is between 6–7 preferably close to 7.0. Solids are 40–45% and particle size is 55–60% finer than 2 $\mu$m. The crude was fractionated to 90% finer than 2 $\mu$m prior to beneficiation to remove colored impurities by ultrarlotation (U.S. Pat. No. 2,990,958) or full Baction floated by the process known in the art as TREP (U.S. 4,472,271 the modified version of which, U.S. Pat. No. 6,378,703, was followed in the practice of this invention) and then fractionated to 90% finer than 2 $\mu$m. The surface area (BET) of the fractionated product was between 13–15 m2/g. The following operations are subsequently performed to make the final product.

1. The fractionated kaolin slurry is diluted to 20–25% solids to facilitate better mixing of the polymer solution subsequently.
2. Keep the feed under agitation using the drill press in lab or some other means of agitation (low-medium shear not high shear)
3. Dilute SF26 to 0.5 wt %. The as-received material is supplied at 50 wt % solids. Dilution of the polymer solution helps in homogeneous distribution of the polymer in the clay slurry.
4. Add the SF26 at 2.25#/t dosage (0.11% of the dry kaolin clay). The dosage may vary from 0.02–0.2% of dry kaolin clay, depending on die particle size distribution and surface area of the feed. A narrower particle size distribution and a lower surface area feed would require a lesser polymer dosage to provide the same performance.
5. Keep the slurry stirring for at least two minutes. The pH of the slurry, close to neutral, is not affected by the polymer addition.
6. Stop stirring and the clay appears flocced. It has a creamy consistency and is easily pourable and pumpable.
7. Add sulfuric acid to bring the pH to 3.0. This acidification may be achieved in conjunction with alum.
8. Add the sodium hydrosulfite (reductive bleach) to the slurry and stir.
9. Filter the flocced kaolin.
10. Rinse the filter cake 1:1 with tap water.
11. Secondary dispersant is added to the filer cake to redispese it for spray drying. Colloid 235 is used as the secondary dispersant in some tests and the pH target is between 6–7. Variants were evaluated to achieve superior results. For example, Colloid 144 which differs from Colloid 235 in not having lignosulfonate as a constituent, was added in place of Colloid 235. Colloid 154 may also be used in place of Colloid 235 at this stage.
12. The slurry is spray dried. The particle size of the spray dried product is narrower than the feed.
13. Makedown the spray dried product at 68% or higher solids. See U.S. Pat. No. 4,772,332. The makedown is achieved with a Cowles blade at 1800–2000 rpm. The psd is that of the feed (Step 1) to which the SF26 was added.
14. Check the Brookfield viscosity at 20 rpm on the madedown slurry.

EXAMPLE 1

The example demonstrates the (GEB) improvement in GE Brightness of a chemically engineered kaolin by elimination of (LS) from the dispersant mixture.

Coarse white crude was floated via the TREP process and fractionated to an 89% finer than 2 $\mu$m particle size; 2.25#/T SHARPFLOC® 26 @ 0.5% solids was added and the slurry was flocced with sulfuric acid, bleached using 6#/T KBRITE® sodium hydrosulfite, filtered, rinsed 1:1, redispersed, 325 mesh screned, and spray dried. The control sample was dispersed with 6#/T COLLOID 235 (contains both LS and NS at 0.05% level each). Another sample was dispersed with 5#/T (0.06% level of NS and no LS present) of Colloid 144. Results are summarized in Table 1.

TABLE 1

|  | Colloid 235 Control | Colloid 144 |
|---|---|---|
| GEB (spray dried material) | 89.8 | 90.2 |
| Brook field viscosity of 68% Solids | 600 | 580 |
| pH | 6.5 | 6.3 |

*Bleached product GEB-90.5.

Table 1 shows that elimination of LS leads to a 0.4 point improvement in GEB. Typically, a plant targets a bleached brightness of 90.4–90.5 to get a 90 minimum GEB spray dried product. A higher bleached brightness is thus required with Colloid 235 to get 90 min GEB spray dried product. A higher bleached brightness product entails increase in float and bleach costs. Thus substitution of Colloid 235 by Colloid 144 obviates higher float and bleach costs.

EXAMPLE 2

This example demonstrates that the chemically engineered kaolin predispersed with Colloid 144 in Example 1 was incompatible with minor addition of calcium carbonate.

A sample of the chemically engineered kaolin was made down at 68.4% solids. A portion of this sample was taken and HYDROCARB® 90 (ground calcium carbonate product from Omaya) was added at 1% level. The Brookfield viscosity (20 rpm) was measured for the control and the HYDROCARB 90 added samples. The Brookfield viscosity, pH and solids were measured for the HYDROCARB 90 added sample as a function of time. Results are summarized in Table 2.

TABLE 2

|  | BROOKFIELD | pH | % SOLIDS |
|---|---|---|---|
| Control | 560 | 6.4 | 68.4 |
| 1% calcium carbonate added |  |  |  |
| 20 min. | 3700 | 7.4 | 68.2 |
| 1 hour | 4805 | 7.4 | 68.2 |
| 3 hours | 6310 | 7.4 | 68.2 |

The Table shows that addition of minor amounts of calcium carbonate significantly increased the viscosity of the slurry of chemically engineered kaolin dispersed with Colloid 144.

EXAMPLE 3

This example demonstrates improving the compatibility of chemically engineered kaolin with calcium carbonate using naphthalene sulfonate.

To the control sample from Example 2, 5#/t (0.25% based on dry kaolin) Lomar D (NS) was added prior to addition of calcium carbonate. The Brookfield viscosity, pH and solids were measured as a function of time. Results are summarized in Table 3.

TABLE 3

| 0.25% dry Lomar D added then 1% calcium carbonate added after 4 hours |  |  |  |
|---|---|---|---|
| 20 min | 744 | 7.4 | 68.8 |
| 1 hour | 680 | 7.4 | 68.8 |
| 3 hours | 772 | 7.4 | 68.8 |

This example illustrates that addition of Lomar D, at a level significantly beyond that is suggested in U.S. Pat. No. 4,859,246, makes the chemically engineered kaolin compatible with calcium carbonate.

EXAMPLE 4

This example demonstrates that the order of addition of Lomar D and calcium carbonate is not important in improving the compatibility with chemically engineered kaolin.

The sample from Example 2 had calcium carbonate added to it followed by addition of Lomar D. The Brookfield viscosity, pH and solids were measured as a function of time. Results are summarized in Table 4.

TABLE 4

| 1% calcium carbonated added then 0.25% dry Lomar D added | BROOKFIELD | pH | % SOLIDS |
|---|---|---|---|
| 20 min. | 710 | 7.4 | 68.3 |
| 1 hour | 670 | 7.4 | 68.3 |
| 3 hours | 770 | 7.4 | 68.3 |

This Example shows that irrespective of the order of addition, Lomar D improves the compatibility of the chemically engineered kaolin with calcium carbonate.

EXAMPLE 5

This example demonstrates the higher efficacy of Lomar D compared with a N-22 (LS).

The addition of N-22, which is a constituent of Colloid 235, was also explored. In example 2, the Lomar D was substituted with N-22. The Brookfield viscosity, pH and solids were measured as a function of time. Results are summarized in Table 5.

TABLE 5

|  | Time |  |  |  |
|---|---|---|---|---|
| Additive | 20 min | 180 min | 24 hours | Solids |
| Lomar D | 440 | 480 | 540 | 66.7 |
| N-22 | 880 | 940 | 1230 | 66.7 |

This Table shows that Lomar D is significantly more effective than N-22 in improving the compatibility of chemically engineered kaolin with calcium carbonate.

EXAMPLE 6

This example demonstrates the impact on GEB of addition of Lomar D and N-22.

The GEB of the chemically engineered kaolin dispersed with COLLOID 144 from Example 1 was measured after addition of Lomar D and N-22 at 5#/t (0.25% of the dry kaolin) level to the spray dryer feed followed by spray drying. Results are shown in Table 6.

TABLE 6

| Sample | GEB, % |
|---|---|
| Chemically engineered kaolin (CEK) | 90.2 |
| CEK + Lomar D | 89.9 |
| CEK + N-22 | 88.8 |

The data show that N-22 is significantly detrimental to the GEB of the chemically engineered kaolin, besides not being as effective as Lomar D in improving compatibility with calcium carbonate.

Levels of Lomar D higher than 0.3% (the overall dosage in this example) would be progressively detrimental to product GEB.

EXAMPLE 7

Tests were conducted to study the effect of pH on compatibility of CEK with calcium carbonate.

A sample of CEK slurry was prepared at 68.5% solids from the dry kaolin pre-dispersed with COLLOID 144 in Example 2 and adjusted to different pH with 10% NaOH prior to addition of 1% HYDROCARB 60. Brookfield viscosity was measured as a function of time. Results are shown in Table 7.

TABLE 7

| Time (hours) | pH 6.5 | 7.5 | 8.5 | 9.0 | 9.5 | 10.0 |
|---|---|---|---|---|---|---|
| | Brookfield viscosity, cP | | | | | |
| 20 min | 4850 | 2750 | 2250 | 2250 | 2450 | 2750 |
| 1 | 8200 | 3400 | 2250 | 2300 | 2350 | 2650 |
| 3 | 8700 | 3550 | 2100 | 2100 | 2200 | 2250 |
| 6 | — | 3900 | 2000 | 2100 | 2050 | 2200 |
| 24 | — | 4950 | 2000 | 2150 | 2150 | 2250 |

This example shows that increasing the pH of the CEK slurry from 6.5 to 7.5 prior to addition of the calcium carbonate significantly decreases the viscosity; however, the viscosity decrease was not sufficient to reduce viscosity to a desired value less than 1000 cP. Also, for long-term stability a pH of higher than 8.5 is necessary.

EXAMPLE 8

Tests were carried out to study the effect of TSPP (tetrasodium pyrophosphate) and Lomar D on compatibility with calcium carbonate Portions of sample in Example 7 were pretreated with different levels of TSPP prior to addition of calcium carbonate (HYDROCARB 60). Brookfield viscosity was measured as a function of time.

TABLE 8

| pH | TSPP added, wt % | Lomar D added, wt % | Time (hours) | | | | |
|---|---|---|---|---|---|---|---|
| | | | 1/3 | 1 | 3 | 6 | 24 |
| | | | Brookfield Viscosity, cP | | | | |
| 6.5 | 0.1 | — | 670 | 780 | 880 | 950 | 1200 |
| 7.5 | 0.1 | — | 730 | 870 | 990 | 1020 | 1190 |

TABLE 8-continued

| pH | TSPP added, wt % | Lomar D added, wt % | Time (hours) | | | | |
|---|---|---|---|---|---|---|---|
| | | | 1/3 | 1 | 3 | 6 | 24 |
| 6.5 | — | 0.25 | 440 | | 480 | | 540 |
| 7.5 | — | 0.25 | 380 | | 400 | | 490 |

The data in Table 8 show that TSPP or Lomar D pretreatment improves the viscosity (in comparison to pH effect alone) to a usable level. Lomar D is preferred to TSPP because compared to TSPP it minimizes the impact on viscosity due to calcium carbonate addition.

EXAMPLE 9

A test was conducted to evaluate the effect of incorporating the extra Lomar D in a secondary dispersant package already containing some naphthalene sulfonate.

Colloid 144 and Colloid 154 (with extra Lomar D) compositions are shown in Table 9 in which all weights are on a dry weight basis.

TABLE 9

| Component | C-144 | C-154 |
|---|---|---|
| Water | 75.0 | 66.7 |
| C-211 | 14.0 | 12.5 |
| DEQUEST 2006 | 1.6 | 1.4 |
| Lomar D | 6.0 | 16.4 |
| NaOH | 3.4 | 3.0 |
| Total % | 100.0 | 100.0 |

Filter cake of the CEK prepared in accordance with Example 1 was redispersed with Colloid 154 and spray dried. The Brookfield and pH were tested with and without 4% HYDROCARB 90. The slurry solid was 68.7%. Without the calcium carbonate addition the Brookfield of the slurry was 860 cP and, in presence of the carbonate, the Brookfield of the slurry was 980 cP after 24 hours.

EXAMPLE 10

Effect of ratio of CEK to calcium carbonate on Brookfield viscosity.

A plant-produced slurry of the CEK at 69% solids was mixed with HYDROCARB 90 slurry (76% solids) to achieve different ratios (dry basis) and the Brookfield viscosity monitored as a function of time (see Table 10)

TABLE 10

| Clay/Carbonate ratio | Time (hours) | | | | |
|---|---|---|---|---|---|
| | 0.33 | 1 | 3 | 6 | 24 |
| | Brookfield Viscosity, CP | | | | |
| 20/80 | 380 | 600 | 480 | 440 | 550 |
| 40/60 | 990 | 750 | 770 | 980 | 1060 |
| 60/40 | 920 | 1070 | 1210 | 1290 | 1780 |
| 80/20 | 1040 | 1080 | 1700 | 2000 | 2250 |

Table 10 shows that as the proportion of calcium carbonate decreases the Brookfield viscosity increases for a given aging time. With 1% or 4% the problem is to be more acute. The increase in Brookfield viscosity may be attributed, at least in par, to decreasing pH with decreasing calcium carbonate resulting in more calcium dissolution. The calcium ions in solution may preferentially bind the naphthalene sulfonate molecules used as auxiliary dispersant for the chemically engineered kaolin thus destabilizing it and resulting in increase in viscosity.

EXAMPLE 11

This example demonstrates the effect of different types of naphthalene sulfonates on viscosity of CEK.

Lomar D is a condensed sodium salt of naphthalene sulfonate that was used in examples mentioned above. Lomar D is a tan colored powder. Cream-colored naphthalene sulfonates, which were also tested in an attempt to avoid any loss in GEB of the product due to secondary dispersant addition that would have the naphthalene sulfonate in the dispersant package. Unfortunately, none of the samples—AG special, LBA special—were found to be effective. These were low molecular grades, all below 1000 amu. While addition of 0.25% Lomar D reduced the GEB from 90.0 to 89.7 without negatively impacting the Brookfield viscosity, the two other versions of naphthalene sulfonate did not reduce the GEB at the same level of addition. However, these other versions impacted the viscosity of the CEK such that no Brookfield viscosity check could be obtained even when the amount of the sulfonates was increased to 0.75% of dry kaolin. The samples would harden on the outside while mixing.

EXAMPLE 12

This example serves to show that presence of SF26 polymer in the CEK renders it more sensitive to carbonate addition and thus necessitates addition of extra Lamar D.

Flotation Brightened kaolin (TREP) was fractionated to 90%/<2m and diluted to 20% solids (see Recipe). It was divided into two portions. DADMAC polymer (C-1) was added to one portion and the other portion was treated with polyamine (SF26). The amount of polymer added in both the cases was 2.25#/t (0.11% based on dry kaolin). Both samples were processed in the same manner from Steps 5–10 as described above in the recipe. Each sample was further divided into two—C-144 was used a secondary dispersant for one portion and C-154 was used as dispersant for the second portion. The C-144 dosage was 7.5#/t (0.09% NS based on dry kaolin) and C-154 dosage was 6.5#/t (0.21% NS based on dry kaolin). The four samples were spray dried and madedown at 68% solids.

Each of the four slurries was treated with 1% HYDROCARB 90. The Brookfield viscosity was measured for the control (0 min) and the HYDROCARB 90 added samples (3 hours). The following Table 11 shows the effect of C-144 and C-154 on Brookfield viscosity with the C-1 and SF26 polymers.

TABLE 11

| Time (h) | Brookfield viscosity (cP) with SF26 cationic polymer | | Brookfield viscosity (cP) with C-1 cationic polymer | |
|---|---|---|---|---|
| | C-144 | C-154 | C-144 | C-154 |
| 0 | 666 | 586 | 386 | 410 |
| 3 | 21,500 | 1,518 | 1,130 | 510 |

Data in Table 11 shows the SF26 polymer is more sensitive to carbonate addition in terms of rheological behavior of the kaolin slurry. Therefore, extra Lomar D is required for stabilization of chemically engineered kaolin slurry prepared with SF26 against calcium carbonate.

The SF26 is, however, more user-friendly and leads to marginally better bulking than C-1 polymer. The user-friendly attribute is due to low viscosity of SF26 polymer solution compared to C-1, which facilitates dilution, pumping and mixing into the kaolin slurry. An indirect evidence of the shear resistance of the flocs is provided by the fact that the C-1 polymer addition results in a Black Glass Scatter (BGS) value of 0.114 $m^2/g$ versus 0.120 $m^2/g$ with SF26 polymer.

EXAMPLE 13

This example serves to show that the CEK preparation may include a delamination step and that C-154 is effective in imparting stability against small amount of calcium carbonate for this product.

TREP product was fractionated to 70%<2 μm and then mechanically delaminated using glass beads in conventional manner to 85%<μm prior to addition of the polymer. The polymer dosage in this case was 1.5#/t rather than 2.25#/t used previously since higher dosages in conjunction with delamination adversely impact make down solids. The polymer addition was followed by successive steps of bleaching, filtration, redispersion with C-154 and spray dring. The plant spray dried product was made down in the laboratory at 66% solids.

1% of HYDROCARB 90 (HC90) was added to the CEK while mixing under a Talboy mixer. The samples were tested as is and after the Hydrocarb 90 was added. They were aged at room temperature for different times as indicated in the Table below.

TABLE 12

| | W/O HC90 | 1% HC90 0 hrs | 1% HC90 1 hr | 1% HC90 3 hrs | 1% HC90 24 hrs |
|---|---|---|---|---|---|
| Brookfield viscosity | 240 | 380 | 460 | 440 | 400 |
| pH | 6.2 | 7.4 | 7.3 | 7.4 | 7.7 |
| GEB | 90.4 | 90.4 | 90.4 | 90.4 | 90.4 |

It is clearly seen that C-154 still acts as an effective dispersant for the CEK when the kaolin used to make CEK is a delaminated grade.

Although variations are shown in the present application, modifications and ramifications occur to those skilled in the art upon reading the present disclosure.

What is claimed is:

1. A white pigment suitable for coating or filling paper which comprises a kaolin clay pigment cationically bulked by an epichlorinamine complex and from ½ to 40% of a calcium carbonate pigment and a dispersant consisting essentially of the combination of from 0.2% to 0.3% based on the dry weight of the bulked kaolin clay pigment of a condensed naphthalene sulfonate complex having a molecular weight between 2000 to 10,000 and a sodium polyacrylate salt having a molecular weight of 2000 to 5000, said dispersant being free from a lignosulfonate dispersant.

2. The pigment of claim 1 wherein said cationically bulked kaolin clay has a brightness of at least 90%.

3. The pigment of claim 1 which is in the form of a fluid slurry having solids content above 65%.

4. The pigment of claim 1 which is in the form of a fluid slurry having a solid content above 67%.

5. The pigment of claim 2 wherein the brightness of said cationically bulked kaolin containing said naphthalene sulfonate complex and said polyacrylate salt is at least 90%.

6. The pigment of claim 1 wherein the kaolin clay is a mechanically delaminated grade.

7. The pigment of claim 1 or 6 wherein said epichlorohydrin amine complex is formed from ethylenediamine, dimethylamine and epichlorohydrin.

8. A paper web coated with the pigment of claim 1.

9. A paper web coated with the pigment of claim 7.

10. In a process for preparing a white pigment mixture suitable for coating paper wherein a cationically bulked kaolin clay pigment is dispersed in water in the presence of an anionic dispersant and mixed with a calcium carbonate pigment, the improvement which comprises using an epichlorohydrin amine complex to bulk said kaolin, and employing as the dispersant the combination of at least 0.20% based on the dry weight of said cationically bulked kaolin of a condensed naphthalene sulfonate complex having a molecular weight of 2000 to 10,000 and a sodium polyacrylate salt having a molecular weight of 2000 to 5000, said dispersant being free from lignosulfonate.

11. The process of claim 10 wherein said cationically bulked kaolin is dispersed with a mixture consisting essentially of 0.2% to 0.3% by weight of a dispersant grade of naphthalene sulfonate, and from 0.10 to 0.16% by weight sodium polyacrylate.

12. The process of claim 10 wherein said calcium carbonate is a ground pigment and is present in amount in the range of ½% to 40% based on the dry weight of the bulked kaolin clay.

13. The process of claim 10 wherein said epichlorohydrin amine condensate is formed from ethylenediamine, dimethylamine and epichlorohydrin.

14. The process of claim 10 wherein said naphthalene sulfonate condensate is a sodium salt.

15. The process of claim 10 wherein said dispersed bulked kaolin clay has a brightness of at least 90% before addition of calcium carbonate.

16. The process of claim 11 wherein said dispersed slurry of cationically bulked kaolin clay mixed with said calcium carbonate pigment has a solids content above 65% by weight.

17. The process of claim 16 wherein the solids content is in the range of 67–70%.

18. The process of claim 16 wherein said dispersed slurry of cationically bulked kaolin clay has Brookfield viscosity as measured at 20 rpm below 2000 cP.

19. The process of claim 10 wherein said white pigment mixture has a Brookfield viscosity as measured at 20 rpm below 1000 cP.

20. The process of claim 10 wherein said kaolin clay had been mechanically delaminated before addition of said epichlorohydrin amine complex.

* * * * *